UNITED STATES PATENT OFFICE.

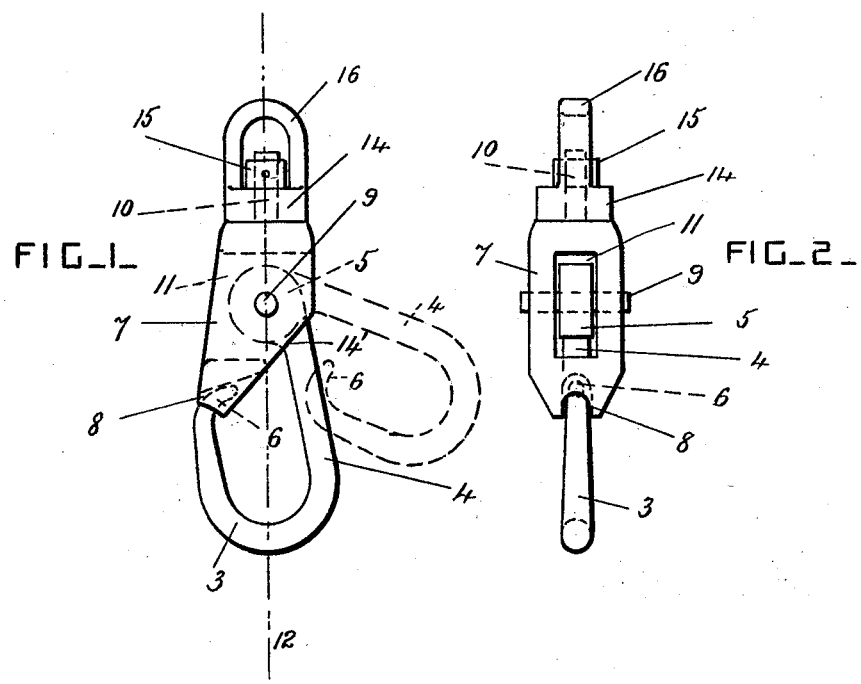

ALBERT MAIDEN, OF COQUILLE, OREGON.

SNAP HOOK.

1,411,857.   Specification of Letters Patent.   Patented Apr. 4, 1922.

Application filed September 15, 1920. Serial No. 410,455.

*To all whom it may concern:*

Be it known that I, ALBERT MAIDEN, a citizen of the United States, residing at Coquille, in the county of Coos and State of Oregon, have invented certain new and useful Improvements in Snap Hooks, of which the following is a specification.

This invention relates to snap hooks or safety hooks specially adapted for use as line hooks in logging operations in connection with large timber; and it consists in the novel construction and combination of the parts hereinafter fully described and claimed.

In the drawings, Figure 1 is a side view of a safety hook constructed according to this invention. Fig. 2 is a side view of the hook turned around one-quarter from the position shown in Fig. 1.

The hook 3 is provided with a shank 4 which has an eye 5 at its other end from its hooked or curved portion. This hook has an inwardly projecting tip 6. This tip is curved around in the same general direction as the hook 3, and it projects substantially one-half way across the hook 3 towards the shank 4. The eye 5 is pivoted by a pin 9 to a latch 7, and the latch has a notched or grooved end portion 8 which normally bears against and straddles the outer side of the tip 6 and limits the movement of the hook in one direction. The latch block 7 is formed of a single piece of metal, and a slot 11 is formed transversely through its middle part for the eye 5 to work in, leaving its top and its notched bottom portion 8 solid metal. The latch prevents the tip of the hook from catching in obstructions as the load is being hauled along. The hook is moved pivotally to the position shown by dotted lines in Fig. 1, to attach the load to it.

The latch is provided with a stem 10 which is arranged longitudinally on the line of draft passing through it and through the centers of the pivot pin 9, and of the hook, and which is indicated by the line 12 in Fig. 1. A swivel collar 14 is journaled to revolve on the stem 10 and is held in place by a head 15 on the stem. The swivel collar 14 has a link member 16 for connecting it to the draft rope or chain. All danger of the hook releasing the load under heavy strain is obviated by placing the pivot pin on the center line of draft, and the notched end portion of the latch prevents the tip of the hook from being bent sidewise out of engagement with the latch. The lower end 14' of the latch extends for substantially equal distances on each side of the center line of draft 12, and at about an angle of 45° with it. The bottom of the notch in the end portion 8 is formed at about an angle of 60° with the center line 12, and the sharply curved end 6 of the hook bears against it as a stop when the hook is closed. When the hook is open, as shown in dotted lines, the space between the tip 6 and the latch end 14' is substantially of the same width as the space between the tip 6 and the shank 4. This arrangement together with the swivel permits the hook to open and close when passing through pulley blocks, or similarly sharply curved passages, without becoming detached from the load.

This line hook or butt hook will not come open in "reverse action" caused when the line continually slacks, tightens, and jerks, as in hauling logs up and down high hills, and through obstructions. The point of the hook also cannot catch in pulling logs through deep mud in swamps where the hook is out of sight, and where it meets with many kinds of obstructions.

What I claim is:

A safety hook, comprising a latch block having a transverse slot in its middle portion, and a draft stem arranged at its upper end and on its line of draft, the said latch block having a beveled lower end portion which extends at an angle across its line of draft, and a notch in its bottom end below the said slot, a hook having an eye at its upper end which works in the said slot, and a pin arranged crosswise of and on the line of draft and pivoting the eye of the hook in the slot of the latch block, said hook having a sharply re-curved tip which engages with the said notch when the hook is closed, a relatively narrow entrance passage being provided between the tip of the hook and the said beveled end portion and between the tip of the hook and its shank when the hook is open.

In testimony whereof I have affixed my signature.

ALBERT MAIDEN.